(12) United States Patent  (10) Patent No.: US 8,109,463 B2
Cox et al.  (45) Date of Patent: Feb. 7, 2012

(54) SELF-PROPELLED UNDERCARRIAGE WHEEL HAVING A LOW PROFILE TIRE

(75) Inventors: Isaiah Watas Cox, Baltimore, MD (US); Rodney Thomas Cox, North Plains, OR (US); Joseph Jeremiah Cox, East St. Kilda (AU)

(73) Assignee: Borealis Technical Limited (GI)

( * ) Notice: Subject to any disclaimer, the term of this patent is extended or adjusted under 35 U.S.C. 154(b) by 365 days.

(21) Appl. No.: 12/310,609

(22) PCT Filed: Aug. 29, 2007

(86) PCT No.: PCT/US2007/019053
§ 371 (c)(1),
(2), (4) Date: Feb. 27, 2009

(87) PCT Pub. No.: WO2008/027458
PCT Pub. Date: Mar. 6, 2008

(65) Prior Publication Data
US 2010/0288873 A1 Nov. 18, 2010

(30) Foreign Application Priority Data
Aug. 29, 2006 (GB) .................................. 0616985.8

(51) Int. Cl.
*B64C 25/02* (2006.01)
(52) U.S. Cl. .................. 244/50; 244/100 R; 244/103 R
(58) Field of Classification Search .................... 244/50, 244/103 R
See application file for complete search history.

(56) References Cited

U.S. PATENT DOCUMENTS

| 4,267,992 | A * | 5/1981 | Harper, Sr. ................. 244/103 R |
| 7,445,178 | B2 * | 11/2008 | McCoskey et al. ............. 244/50 |
| 7,528,518 | B2 * | 5/2009 | Maeda et al. ................ 310/67 R |
| 2007/0158497 | A1 * | 7/2007 | Edelson et al. ............ 244/103 S |
| 2009/0261197 | A1 * | 10/2009 | Cox et al. .......................... 244/50 |
| 2010/0147995 | A1 * | 6/2010 | Cros et al. ....................... 244/50 |
| 2010/0206980 | A1 * | 8/2010 | Cros et al. ....................... 244/50 |
| 2010/0276535 | A1 * | 11/2010 | Charuel et al. ................. 244/50 |
| 2010/0288873 | A1 * | 11/2010 | Cox et al. ........................ 244/50 |

* cited by examiner

*Primary Examiner* — Frank T Palo

(57) ABSTRACT

An undercarriage wheel is disclosed comprising an axle member that supports a drive member, for example but not limited to a compact high torque electric motor, a wheel member driven by said drive member, and a tire attached to the wheel member, wherein the tire bulges in the width dimension of the wheel, wherein the drive member protrudes from the wheel member and thus occupies at least some of the additional width made available by the bulge of the tire. A further aspect of the invention is an undercarriage wheel that comprises an axle member that supports a drive member, for example but not limited to a compact high torque electric motor, a wheel member driven by said drive member, and a low-profile tire attached to the wheel member. Since the profile of the tire is low, additional space is available inside the wheel for the drive member. Preferably, the drive member occupies at least some of this additional space, and has sufficient power to be able to propel an aircraft to which the undercarriage assembly is attached, either alone or in combination with other self-propelled undercarriage assemblies attached to the aircraft.

17 Claims, 2 Drawing Sheets

SELF-PROPELLED UNDERCARRIAGE WHEEL HAVING A LOW PROFILE TIRE

CROSS-REFERENCE TO RELATED APPLICATIONS

This application is the U.S. national stage application of International Application No. PCT/US2007/019053, filed 29 Aug. 2007, which international application was published on Mar. 6, 2008, as International Publication WO 2008/027458-A2 in the English language. The International Application claims the benefit of GB Provisional Patent Application No. 0616985.8, filed 29 Aug. 2006. The above-mentioned patent applications are herein incorporated in their entirety by reference.

TECHNICAL FIELD

This invention relates to the undercarriage of aircraft.

BACKGROUND ART

Aircraft undercarriage, or landing gear, are wheels on which aircraft move when on the ground.

In modern aircraft, undercarriage wheels are usually arranged in a tricycle formation, having a wheel or group of wheels under each wing, and a wheel or group of wheels under the nose of the aircraft. The wheels generally retract into a bay inside the fuselage during flight. This is necessary to eliminate the drag which they would otherwise cause. Doors are sometimes attached to the bay. These doors open to let the undercarriage wheels out, and close to protect the wheels and reduce drag during flight. The undercarriage wheels are generally attached to the fuselage via retractable support struts, such as telescopic, liquid filled struts. Shock absorbing mechanisms are usually built into the struts. Undercarriage wheel tires are generally high profile pneumatic tires. Fan blades, air scoops or small motors are known in the art for causing the wheel to turn at the speed of travel, prior to landing, to reduce wear in the tires caused upon landing.

The use of separate motors to move aircraft on the ground is helpful since it avoids using the aircraft turbines or a separate tug to move the aircraft.

U.S. Pat. No. 3,711,043 to Cameron-Johnson discloses an aircraft drive wheel having a fluid-pressure-operated motor housed within the wheel and two planetary gear stages housed in a gear box outboard of the motor, the final drive being transmitted from a ring gear of the second gear stage, which is inboard of the first stage, to the wheel through an output drive quill coupled, through a disc-type clutch if desired, to a flanged final drive member surrounding the inner end of the gear box and bolted to the wheel.

U.S. Pat. No. 3,977,631 to Jenny discloses a wheel drive motor selectively coupled to an aircraft wheel through a rotatably mounted aircraft brake assembly in order to drive the wheels of an aircraft. The normally non-rotating stator portion of a conventional aircraft brake assembly is rotatably mounted about the wheel axle and is rotatably driven through a planetary gear system by the wheel drive motor.

A solution disclosed in PCT application WO2005/035358 discloses a mesh connected high phase order induction motor, situated in close proximity to, and preferably within, the nosegear. The mesh connection enables variable inductance so that the machine has a range of speed/torque profiles available.

European Patent No. 0 756 556 B1 to Giovanardi and Centofante discloses an aircraft having wheel driving means associated with at least one of the wheels of the landing gear. A motor powered by the auxiliary power unit of the aircraft is used to drive the wheels of the landing gear. The assembly comprises an electric or hydraulic motor in operative connection with a differential gear assembly, each wheel being mounted on an axle in forward operative connection with a respective half-shaft of the differential gear through a free wheel mechanism.

All of the solutions mentioned above require extra space to be occupied close to the undercarriage wheel, requiring extra space in the bay into which the undercarriage retracts. Space in this area is severely restricted. The shape and volume of the bay into which the undercarriage wheel retracts is of fixed size and cannot easily be altered. Further, using a bigger wheel and a bigger tire, in order to house a motor powerful enough to move the plane unassisted, will increase the mass of that part of the undercarriage, which may have deleterious effects on the balance and handling of the aircraft.

U.S. Pat. No. 4,267,992 to Harper discloses a tire and wheel assembly in which a low profile pneumatic tire having sidewalls which deflect inwardly under load and a wheel having a rim featuring a narrow central channel and extended rim flanges form the combination. This reduces the total assembly diameter required for a given unit load thereby reducing or eliminating wing surface bulges for vertically stowed wheels as well as reducing the drag profile of the wheel well area.

DISCLOSURE OF INVENTION

From the foregoing, it may be appreciated that a need has arisen to increase the volume available within a standard aircraft undercarriage wheel to house active motor components of a sufficient size to provide the necessary power to propel the aircraft, whilst not increasing the overall space occupied by the tire and the wheel.

The present invention is an undercarriage wheel assembly that comprises an axle member that supports a drive member, for example but not limited to a compact high torque electric motor; a wheel member driven by said drive member; and a tire attached to the wheel member, wherein the tire wall bulges, causing the width of the tire at its widest point to be greater than the width of the tire tread, wherein the motor protrudes from the wheel member, at most to the width of the widest point of the tire, and thus occupies at least some of the additional width made available by the bulge of the tire. In this context, the bulge of the tire is defined as the protrusion caused by the curvature of the tire wall, shown as (22) in FIGS. 1 and 2.

A further aspect of the invention is an undercarriage wheel assembly that comprises an axle member that supports a drive member, for example but not limited to a compact high torque electric motor, a wheel member driven by said drive member, and a low-profile tire attached to the wheel member. The undercarriage wheel assembly may also comprise at least one gearing member connecting said wheel member to said drive member. Since the profile of the tire is low, additional space is available inside the wheel for the motor and said at least one gearing member. Preferably, the motor occupies at least some of this additional space. Gearing members may also occupy at least some of this additional space.

Gearing members may connect said wheel member to said motor and occupy some of said additional width. In the case where at least one gearing member is present, said gearing member and/or said motor may protrude from said wheel member and thus occupy at least some of the additional width made available by the bulge of the tire, or by the use of low-profile tires.

An advantage of the present invention is that the increase in space available for the drive member enables the use of a drive member that has sufficient power to be able to propel an aircraft to which the undercarriage assembly is attached, either alone or in combination with other self-propelled undercarriage assemblies attached to the aircraft.

An further advantage of the present invention is that its overall shape and size can take advantage of existing and unused space available in the bay into which the undercarriage assembly retracts, an area where space is at a premium. Ideally, the dimensions of the present invention are substantially equal to the dimensions of a standard wheel member having a standard tire affixed thereto, thus a further advantage of the present invention is that standard undercarriage wheel assemblies can be replaced by the assembly of the present invention with no alteration necessary to the aircraft bay into which the assembly retracts.

A yet further advantage of the invention is that the existing undercarriage assembly can be replaced with a self-propelled undercarriage assembly without negatively affecting the braking, traction, wet handling, load bearing, or other capabilities of the wheel.

BRIEF DESCRIPTION OF DRAWINGS

For a more complete explanation of the present invention and the technical advantages thereof, reference is now made to the following description and the accompanying drawings, in which.

BEST MODE FOR CARRYING OUT THE INVENTION

Figure 1:
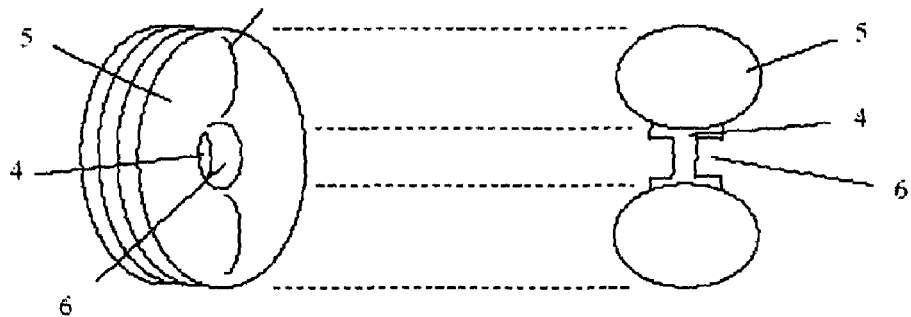
FIG. 1 (Prior Art) shows a standard undercarriage assembly.

In a conventional undercarriage assembly, such as that shown diagrammatically in FIG. 1, a tire 5 is supported by a wheel member 4. The dimensions of such an assembly are governed by the outside diameter of the tire and the width of the tire, rather than by the size of the wheel, and any undercarriage bay on an aircraft is designed accordingly.

Figure 2:
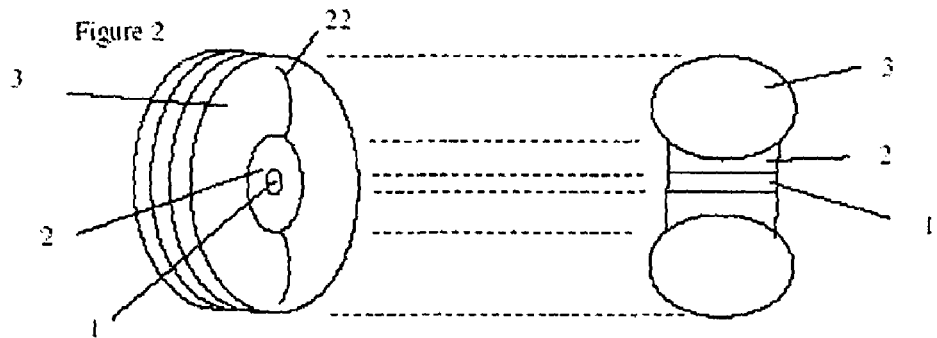
FIG. 2 shows an undercarriage assembly containing a drive member extended to close to the width of the tire.

Referring now to FIG. 2, which shows a first embodiment of the self-propelled undercarriage assembly of the present invention, a drive member comprising a fixed element 1 and a driven element 2 is located inside a wheel member of the kind shown in FIG. 1 (not shown). The drive member has sufficient power to be able to propel an aircraft to which the undercarriage assembly is attached, either alone or in combination with other self-propelled undercarriage assemblies attached to the aircraft. The fixed element is preferably internal to the driven element, as shown in FIG. 2, and the fixed element is attached to a wheel axle (not shown). The driven element is attached to the wheel member, for turning the wheel member. The tire 3 is supported by the wheel member. A key feature of this embodiment of the present invention is that the drive member (comprising fixed element 1 and driven element 2) extends beyond the width of the conventional wheel member 4 to the full width of the tire. This means that the fixed element 1 and driven element 2 of the present invention occupy the space of the cavity 6 of the standard undercarriage wheel shown in FIG. 1, as well as some space outside cavity 6. In other words, the drive member (comprising fixed element 1 and driven element 2) extends at least beyond the width of the wheel member, and at most, to the width of the tire, including the bulge of the tire wall at the widest point of said tire wall.

Figure 3:
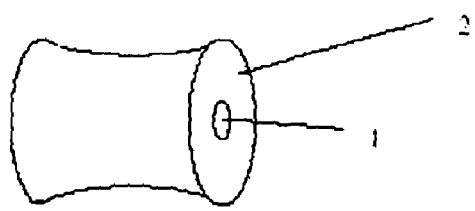
FIG. 3 shows the shape of the drive member of the first embodiment.

Referring now to FIG. 3, in this embodiment, the drive member may take the shape of the tire, and the width of the fixed element and the driven element are close to the width of the tire. The combination of the tire and the drive member thus creates a shape close to a solid cylinder. This is in contrast to the shape of a standard tire 5 and wheel 4, wherein the tire extends significantly beyond the wheel.

Alternatively, said drive member may protrude only to some degree from the width of the tire at its narrowest point and may not extend to the full width of the bulge. As a further alternative, the shape of the drive member may not follow the shape of the tire and may be of a different shape while still fitting into the shape allowed in the wheel hub by the tire. All connections between components of the assembly of the present invention may be direct or indirect, via other components.

Figure 4:
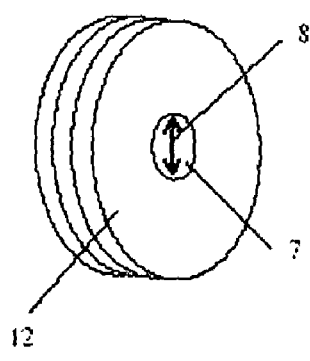
FIG. 4 (Prior Art) shows an undercarriage assembly with a standard high profile tire.
Figure 5:
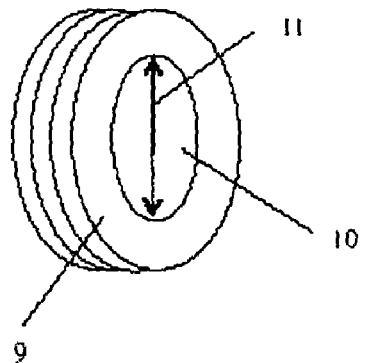
FIG. 5 shows an undercarriage assembly with a low profile tire.
Figure 6:
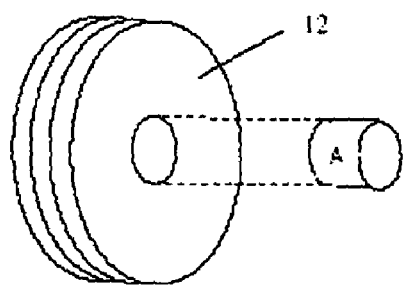
FIG. 6 (Prior Art) shows the space available inside a standard tire.
Figure 7:
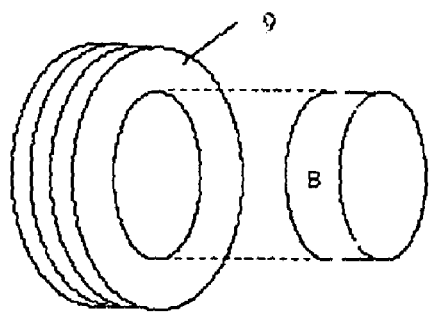
FIG. 7 shows the space available inside a low profile tire.

Referring now to FIG. 5, which shows a second embodiment of the self-propelled undercarriage assembly of the present invention, low profile tire 9 is attached to the outer diameter of wheel member 10. Thus the space available inside wheel member 10 for the drive member has diameter 11. For comparison, FIG. 4 (prior art) shows a tire 12 with a conventional profile in which the space available inside wheel member 7 for the drive member only has a diameter 8. Thus, in the present embodiment of the invention, additional space is created in which to house the drive member, by using a low profile tire. This is further illustrated in FIG. 6 (prior art) which shows the volume (A) available inside a wheel member supporting a conventional tire, and FIG. 7 which shows the greater volume (B) available inside the a wheel member supporting a low profile tire of the present embodiment. The additional space created by the present embodiment is therefore volume B minus volume A.

The self-propelled undercarriage assembly of the present invention thus has dimensions substantially similar to that of a standard undercarriage assembly, and therefore may replace an existing non-self-propelled undercarriage assembly or assemblies in existing aircraft. A third embodiment of the invention therefore is a method for replacing an existing non-self-propelled undercarriage wheel with a self-propelled undercarriage, comprising the steps of removing the existing undercarriage wheel from a fuselage bay of the aircraft; and fitting the self-propelled undercarriage assembly of the invention into the bay. Since the self-propelled undercarriage assembly has dimensions substantially equal to the existing undercarriage wheel, the performance of the self-propelled undercarriage is not negatively affected in terms of braking, traction, wet handling, load bearing, or other capabilities.

In the foregoing, the drive member may occupy either the extra space provided by the bulge of the tire disclosed above in the first embodiment, or the extra space afforded by only the use of a low profile tire as disclosed in the second embodiment. In addition, extra space may be provided by a combination of both embodiments. Furthermore, the extra space provided may be utilised by other components. Thus, in a fourth embodiment, the drive member occupies only some of the space of the motor in the first or second embodiment, and gear members may occupy the remainder of the space. Thus the assembly may have at least one gear member connecting said wheel member to said drive member. The gear member or members may be sun and planet gears, eccentric gears, hypocycloid gears, or any gear or combination of gears.

Preferably said drive member is a high phase order, mesh connected induction motor such as, but not limited to, that disclosed in U.S. Pat. No. 6,657,334 to Edelson, included herein by reference. Said drive member may also be other forms of mesh connected high phase order motors, other high phase order induction motors, other forms of induction motors, or any other means of driving a wheel.

Figure 8:
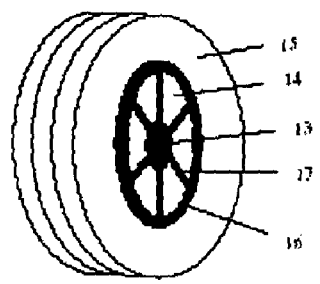
FIG. 8 shows an undercarriage assembly having a driven element internal to a fixed element, with connecting means joining the driven element to the wheel.
Figure 9:
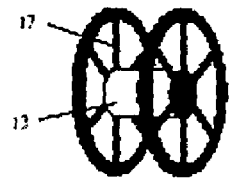
FIG. 9 shows the driven element and connecting means of the assembly of FIG. 8.

Whilst the fixed element is shown as being internal to the driven element in FIGS. 2 and 3, in a further alternative the fixed element may be external to the driven element. Thus in a fifth embodiment, shown in FIGS. 8 and 9, a self-propelled undercarriage assembly comprises an axle member, a wheel member, a drive member, and a tire. The drive member is located inside the wheel member. The drive member is an induction motor and comprises a fixed member 14 and a driven member 13. The driven member is preferably internal to the fixed member, and the fixed element may be toroidally wound. Alternatively the driven element is external to the fixed element, and the driven element may be toroidally wound. Connecting means 17 connect the driven member to a rim 16 of the wheel. A tire 15 is attached to the external diameter of said rim 16. The connecting means may be spokes on one or both ends of the driven member, or other connectors. The connecting means may be formed as part of said driven member or said rim, or may be affixed thereto by means of screws, bolts, or other means. For example, FIG. 9 shows a form of connecting means 17 at each end of the driven member 13.

Figure 10:
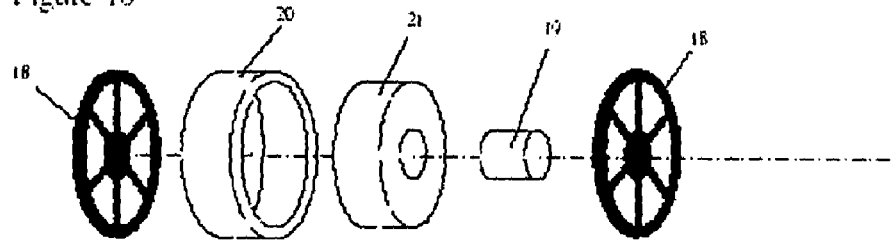
FIG. 10 shows an exploded diagram of an undercarriage assembly having both an internal and an external driven element, with connecting means.

In a sixth embodiment, as shown in FIG. 10, the motor has one fixed element and two driven elements, one which is internal to the fixed element and one which is external to the fixed element, which driven elements are joined. Connecting means 18 connect the internal driven element 19 and the external driven element 20 to each other. A tire is attached to the external diameter of said external driven element 20. Thus both driven elements are free to rotate about said fixed element 21. The connecting means may be spokes on one or both ends of the driven elements, or other connectors. The connecting means may be formed as part of said driven elements, or may be affixed thereto by means of screws, bolts, or other means. Connecting means 18 may be completely non conductive, and serve only to unite the two driven elements 19 and 20, enabling them to spin in synchrony, and together provide rotational energy to a load. Alternatively, connecting means 18 may be able to conduct electricity as an axial flux driven element, providing a total of three driven elements rotating in synchrony. As a further alternative, multiple fixed and driven element combinations may be interleaved together. For example with five components, the configuration leading from the center would be driven-fixed-driven-fixed-driven. As a further alternative, connecting means 18 are not used, and the two driven elements are able to spin independently. The two active sections may have different characteristics from one another in response to the stator magnetic field of said fixed element, and each driven element may rotate independently from the other with a different orientation or speed. As a further alternative, the dual driven element combination consists of one driven element normal to the other. These may be connected together to rotate in synchrony.

The foregoing discloses an assembly having a single wheel; however the invention also contemplates more than one wheel placed side-by-side and driven by a single motor located within the space comprised by the hub of both adjacent wheels.

Whilst the self-propelled undercarriage assembly may be used to replace any of the undercarriage assemblies of an aircraft, preferably said undercarriage assembly is used to drive the nosewheel of an aircraft.

INDUSTRIAL APPLICABILITY

The foregoing discloses a means to increase the volume available within a standard aircraft undercarriage wheel, for active motor components of sufficient power to be able to propel an aircraft to which the undercarriage assembly is attached, either alone or in combination with other self-propelled undercarriage assemblies attached to the aircraft, whilst not increasing the overall space occupied by the tire and the wheel; thus standard non-self-propelled undercarriage wheel assemblies can be replaced by the assembly of the present invention with no alteration necessary to the aircraft bay into which the assembly retracts.

The invention claimed is:

1. A self-propelled aircraft undercarriage wheel assembly with external dimensions substantially equal to the external dimensions of a non-self-propelled standard aircraft undercarriage wheel assembly and including an axle supporting a wheel member, a compact high torque drive motor of a sufficient size to provide the necessary power to drive the aircraft on the ground, and a tire mounted on the wheel member, wherein the configurations of said wheel member and said tire mounted thereon produce a maximum volume within the wheel member to support the drive motor completely within the maximum volume produced, said tire configuration having a low profile and said wheel member having a diameter selected to mount said tire and produce said maximum volume.

2. The undercarriage assembly of claim 1, wherein said self-propelled aircraft undercarriage assembly is sized to replace an existing undercarriage in an existing aircraft and fits into a space available in a fuselage bay of said existing undercarriage without negatively affecting the performance of said existing undercarriage.

3. The undercarriage assembly of claim 1 wherein said drive motor includes a fixed element connected to said axle and a driven element attached to said wheel member.

4. The undercarriage assembly of claim 1 in which at least one of said fixed element and said driven element is toroidally wound.

5. The undercarriage assembly of claim 1, wherein said drive motor includes a driven element connected to said axle and a fixed element attached to said wheel member.

6. The undercarriage assembly of claim 1, wherein said drive motor includes a first driven element internal to a fixed element and a second driven element external to said fixed element, and connecting means join said driven elements.

7. The apparatus of claim 6, wherein said first and second driven elements are normal to each other.

8. The undercarriage assembly of claim 1, wherein said drive motor includes more than one fixed element and more than one driven element.

9. The undercarriage assembly of claim 1, wherein said drive motor includes fixed and driven elements that are interleaved.

10. The undercarriage assembly of claim 1 for an aircraft nose wheel.

11. The assembly of claim 1 additionally comprising one or more further wheel members, and wherein said drive motor rotates said wheel members.

12. The undercarriage assembly of claim 1, in which said drive motor is a motor selected from the list comprising: an electric motor; an induction motor; a high phase order induction motor.

13. The undercarriage assembly of claim 1, wherein said drive motor has a driven element and a fixed element and said driven element is external to said fixed element or internal to said fixed element.

14. A method for replacing an existing aircraft undercarriage wheel with an aircraft undercarriage wheel assembly as described in claim 1, comprising the steps of:
   (a) removing an existing undercarriage wheel from at least one fuselage bay of the aircraft;
   (b) fitting into each said at least one bay, the self-propelled undercarriage assembly of claim 1; wherein said drive motor fits completely within the maximum volume produced by the low profile tire and the selected diameter of the wheel member.

15. The method of claim 14, wherein said existing undercarriage wheel is a nosewheel.

16. The method of claim 14, wherein the existing undercarriage wheel is removed from and replaced in all fuselage bays of the aircraft.

17. The method of claim 14, wherein said existing undercarriage wheel is a wheel other than a nosewheel.

\* \* \* \* \*